United States Patent [19]

DeGenova et al.

[11] Patent Number: 5,200,435
[45] Date of Patent: Apr. 6, 1993

[54] COMPOSITION OF FLEXIBLE POLYURETHANE FOAMS BLOWN USING REDUCED AMOUNS OF CHLOROFLUOROCARBON BLOWING AGENTS AND METHOD FOR PREPARATION

[75] Inventors: Ricardo DeGenova, Lake Jackson; Jerram B. Nichols, Alvin, both of Tex.

[73] Assignee: The Dow Chemical Company, Midland, Mich.

[21] Appl. No.: 757,862

[22] Filed: Sep. 11, 1991

[51] Int. Cl.$^5$ ............................................. C08G 18/14
[52] U.S. Cl. ..................................... 521/159; 521/160; 524/196
[58] Field of Search ................................. 521/159, 160

[56] References Cited

U.S. PATENT DOCUMENTS

| | | | |
|---|---|---|---|
| 4,237,240 | 12/1980 | Jarre et al. | 521/159 |
| 4,251,639 | 2/1981 | Jarre et al. | 521/159 |
| 4,256,849 | 3/1981 | Ick et al. | 521/160 |
| 4,261,852 | 4/1981 | Carroll et al. | 521/159 |
| 4,365,025 | 12/1982 | Murch et al. | 521/159 |
| 4,374,209 | 2/1983 | Rowlands | 521/164 |
| 4,379,856 | 4/1983 | Samaritter et al. | 521/159 |
| 4,382,125 | 5/1983 | Narayan et al. | 521/160 |
| 4,383,070 | 5/1983 | Markusch et al. | 524/317 |
| 4,384,050 | 5/1983 | Guthrie | 521/160 |
| 4,448,904 | 5/1984 | Dominguez | 521/160 |
| 4,478,960 | 10/1984 | Buethe et al. | 521/160 |
| 4,525,490 | 6/1985 | Smith | 521/131 |
| 4,539,156 | 9/1985 | Dewhurst et al. | 560/330 |
| 4,539,157 | 9/1985 | Dewhurst et al. | 560/330 |
| 4,539,158 | 9/1985 | Dewhurst et al. | 560/330 |
| 4,668,708 | 5/1987 | Mueller et al. | 521/159 |
| 4,792,575 | 12/1988 | Takao et al. | 521/159 |

Primary Examiner—Morton Foelak

[57] ABSTRACT

Flexible polyurethane foams prepared from formulations requiring reduced amounts of chlorofluorocarbon blowing agents are disclosed. The foams can be prepared without undesirable loss of physical properties with formulations comprising an "A" component which is a blend of a polymethylene polydiphenyldiisocyanate and a methylene diphenyldiisocyanate prepolymer wherein the methylene diphenyldiisocyanate prepolymer is prepared from a prepolymer formulation containing an active hydrogen containing compound which has an equivalent weight of about 30 to about 600; a "B" component which includes an active hydrogen containing compound; and a carbon dioxide generating blowing agent. Also disclosed are polyisocyanate blends consisting of polymethylene polydiphenyldiisocyanate and methylene diphenyldiisocyanate prepolymers useful for preparing flexible polyurethane foams. Methods of preparing both the foams and the polyisocyanate blends are also disclosed. The foams of the present invention can be prepared to have improved tensile and tear values. Formulations of the present invention also display advantageously improved processing characteristics such as flowability.

7 Claims, No Drawings

COMPOSITION OF FLEXIBLE POLYURETHANE FOAMS BLOWN USING REDUCED AMOUNS OF CHLOROFLUOROCARBON BLOWING AGENTS AND METHOD FOR PREPARATION

BACKGROUND OF THE INVENTION

This invention relates to flexible polyurethane foams and a method for their preparation. This invention particularly relates to flexible polyurethane foams requiring reduced amounts of chlorofluorocarbon blowing agents.

Flexible polyurethane foams are used in a wide variety of applications. Such applications include bedding, carpet backing, packaging, toys, furniture cushion manufacture, and the like. Use of flexible polyurethane foams in automobiles is one such application and a very important one. In automobile manufacturing, flexible polyurethane foams are used to prepare seat cushions, arm rests, head rests, knee buttresses, and the like.

Flexible polyurethane foams used in automobile manufacturing function in at least two ways. The first is to provide comfort. Flexible polyurethane foams can be prepared to provide variable load bearing strength. Foams with relatively low load bearing strength are perceived as being "soft". Seating is often perceived as being more comfortable when the seating is soft. However, when the foam around that soft section has a higher load bearing strength, one sitting on such a cushion is held in place against sudden lateral motions, the cushion thereby also providing support. By varying the load bearing strength of the foams in automobile seat cushions such that the seats are softer in the middle and firmer at the sides, automobile seats can be prepared which provide both comfort and support. Load bearing strength is varied by altering the ratio of the two primary components of a polyurethane foam, a polyisocyanate component and an active hydrogen containing component. This ratio is also known as the foam's isocyanate index or simply, index.

Second, flexible polyurethane foams function to contribute to automobile safety. Use of foam in, for example, knee buttresses, contributes to automobile safety because the foam absorbs kinetic energy from an object impacting it. In the event of an automobile collision, where a passenger's knees impact a knee buttress, energy is absorbed by the foam as it deforms and lessens the effect of impact on the passenger, thereby reducing or eliminating injury.

Traditionally, flexible polyurethane foams have been prepared from toluene diisocyanate (TDI) formulations. TDI is prepared by phosgenating toluene diamine. The phosgenation reaction product is distilled to produce TDI monomer and a residue which is typically discarded. TDI has a functionality of about 2.0.

A relatively recent trend in the production of flexible polyurethane foams is to prepare them from methylene diphenyldiisocyanate (MDI) formulations rather than TDI formulations where applications require physical properties not attainable with TDI, or where the lower vapor pressure of MDI makes it a desirable alternative to TDI. MDI is prepared by phosgenating polymethylene polydianiline. The phosgenation reaction product is often distilled to produce MDI monomer and a residue containing polymeric MDI known as PMDI. PMDI is sometimes directly produced without a distillation step by phosgenating polymethylene polydianiline to produce a PMDI with desirable viscosity, isomer ratio, or other physical properties. PMDI is often useful in applications where material of higher functionality is required, such as the production of rigid polyisocyanurate foams. The functionality of PMDI can exceed about 3.0.

Rather than using MDI or TDI monomer to produce flexible polyurethane foams, a polyisocyanate, particularly polymethylene polydiphenyldiisocyanate, or a prepolymer can sometimes be used instead. A prepolymer is the reaction product of a di- or poly-isocyanate and an active hydrogen containing compound, such as a polyol or polyamine. Prepolymers can be prepared from formulations having an excess, that is, more than a 1:1 equivalent ratio, of either the active hydrogen containing compounds or the di- or poly-isocyanate. Prepolymers prepared from formulations having an excess of active hydrogen containing compounds are described as OH— or NH— terminated and are further reacted with additional di- or poly-isocyanate to prepare a polyurethane. Prepolymers prepared from formulations having an excess of di- or poly-isocyanate are described as ISO— or NCO— terminated and are further reacted with active hydrogen containing compounds to prepare a polyurethane.

U.S. Pat. No. 4,261,852 to Carroll, et al. discloses preparing a liquid polyisocyanate composition by blending PMDI and an MDI prepolymer. This patent describes prepolymers prepared from formulations having polyether diols or triols, or blends of polyether diols and triol, of 700 equivalent weight or greater.

Foams are prepared by frothing a liquid matrix which afterwards solidifies into a solid having many voids. In preparing a foam, a source of vapor or gas must be provided in order to froth the liquid matrix. Materials which produce or act as these sources of gas or vapor are called blowing agents. A blowing agent is a material which vaporizes or otherwise produces gas during the forming of a foam and thereby serves to reduce the density of the foam. Chlorofluorocarbons have long been used as blowing agents for flexible polyurethane foams. However, due to environmental considerations, the use of chlorofluorocarbons has been increasingly discouraged and use of alternative blowing agents has been found to be desirable.

An example of an alternative type of blowing agent is carbon dioxide. Foams produced from formulations having blowing agents which generate carbon dioxide are considered environmentally superior to foams prepared utilizing only chlorofluorocarbon blowing agents. Water reacts with isocyanates to produce carbon dioxide and is an example of a carbon dioxide producing blowing agent.

While it has been found desirable to reduce the use of chlorofluorocarbon blowing agents, it has not always been trouble-free to do so. Chlorofluorocarbons often contribute to the physical properties of the foams produced therewith. For example, foams produced from formulations having carbon dioxide generating blowing agents rather than chlorofluorocarbon blowing agents often have poorer insulative and flammability properties. Generally, reducing chlorofluorocarbon blowing agents in favor of carbon dioxide generating blowing agents results in a flexible polyurethane foam with poorer physical properties such as tear strength, tensile strength, and elongation.

SUMMARY OF THE INVENTION

In one aspect, the present invention is a composition of a flexible polyurethane foam prepared from a foam formulation comprising: (1) an "A" component consisting of a blend of an MDI prepolymer and a PMDI wherein the MDI prepolymer is prepared from a prepolymer formulation including a first active hydrogen containing compound having an average equivalent weight of less than about 600, (2) a "B" component containing of a second active hydrogen containing compound, and (3) a carbon dioxide generating blowing agent.

In another aspect, the present invention is a method for preparing a flexible polyurethane foam comprising mixing as foam formulation components: (1) an "A" component consisting of a blend of an MDI prepolymer and a PMDI wherein the MDI prepolymer is prepared from a prepolymer formulation having a first active hydrogen containing compound having an average equivalent weight of less than about 600, (2) a "B" component containing a second active hydrogen containing compound, and (3) a carbon dioxide generating blowing agent, under reaction conditions sufficient to prepare a flexible polyurethane foam.

In yet another aspect, the present invention is a composition of a polyisocyanate blend useful for preparing flexible polyurethane foams comprising a blend of a PMDI and an MDI prepolymer wherein the prepolymer is prepared from a formulation including an active hydrogen containing compound having an average equivalent weight of from about 30 to about 600.

In a final aspect, the present invention is a method for preparing a polyisocyanate blend useful for preparing flexible polyurethane foams comprising blending a PMDI and an MDI prepolymer wherein the prepolymer is prepared from a formulation including an active hydrogen containing compound having an average equivalent weight of from about 30 to about 600.

The flexible polyurethane foams of the present invention can be prepared such that they have advantageously high values in certain physical properties, such as tensile strength and tear strength. Additionally, the foams of the present invention can be produced using reduced levels of chlorofluorocarbon blowing agents. The foams of the present invention can also be produced using no chlorofluorocarbon containing agents. Especially important for automotive manufacturing applications, the foams of the present invention can be prepared to have improved surface appearance and fewer voids. The foam formulations of the present invention can have better flowability during processing than conventional flexible polyurethane foam formulations.

DESCRIPTION OF THE PREFERRED EMBODIMENTS

The foams of the present invention are prepared by mixing an "A" component consisting of a blend of MDI prepolymer and PMDI, and a "B" component. The MDI prepolymer of the "A" component is any prepolymer prepared by reacting MDI with an active hydrogen containing compound having a functionality of at least about 2.0 and no greater than about 3.0.

The active hydrogen containing compound used to prepare the prepolymer of the present invention will preferably have an equivalent weight of at least about 30 and no greater than about 600, more preferably from about 60 to about 400 and most preferably from about 80 to about 250. Active hydrogen containing compounds suitable for preparing the MDI prepolymer of the present invention preferably have ether linkages and include but are not limited to ethylene glycol, dipropylene glycol, tripropylene glycol, polyether diols having ethylene oxide units, polyether diols having propylene oxide units, polyether triols having ethylene oxide units, polyether triols having propylene oxide units, ethylene oxide capped polypropylene diols, ethylene oxide capped polypropylene triols, and the like, as well as mixtures of two or more of the above. For example, one preferred prepolymer useful in the present invention is prepared by mixing MDI with a mixture of dipropylene glycol and tripropylene glycol.

The "A" component used to prepare the foams of the present invention also contains PMDI. The PMDI of the "A" component preferably contains from about 40 percent MDI monomer to about 60 percent MDI monomer, but more preferably contains from about 50 percent MDI monomer to about 60 percent MDI monomer. Of the MDI monomer present in the PMDI, the 2,4' isomer is preferably present in a concentration of from about 5 to about 15 percent and more preferably from about 8 to about 13 percent.

The ratio of prepolymer to PMDI used to prepare the foams of the present invention will vary with the application. For example, the ratio of prepolymer to PMDI can be as high as from about 90:10 to as low as about 10:90. However, the preferred ratio of prepolymer to PMDI for practice of the present invention is from about 80:20 to about 20:80, more preferably from about 30:70 to about 70:30, and most preferably from about 60:40 to about 40:60. In all cases, the isocyanate content of the blend is less than about 30 percent.

In preparing the flexible polyurethane foams of the present invention, an "A" component is mixed with a "B" component which is an active hydrogen containing compound. The active hydrogen containing compounds of the "B" component can be either the same as those used to prepare the prepolymer of the "A" component or they can be different. Active hydrogen containing compounds most commonly used in polyurethane production are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst ed., Applied Science Publishers, pp. 1–76 (1978). However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly(oxyropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols.

Polyamines, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile copolymer polyol stabilizers: and chain transfer agents such as isopropanol.

While all of the active hydrogen containing compounds listed above can be used with the present invention, the preferred materials have oxy-ether linkages. The active hydrogen containing compounds also include a polyether diol or a polyether triol, or more preferably a mixture of a polyether triol and polyether diol where the equivalent weight is preferably from about 1000 to about 3000 grams per equivalent (g/eq), more preferably about 1500 g/eq to about 2500 g/eq, and most preferably about 2000 g/eq. Acrylonitrile-styrene copolymers with the mixed diols and triols above are also preferred.

The "B" component of the present invention also contains at least one blowing agent. One of the blowing agents is a carbon dioxide generating blowing agent, such as water or a carboxylic acid. Other blowing agents which can be used with the present invention include organic blowing agents which are volatile at reaction temperatures and dissolved inert gases. Suitable organic blowing agents include acetone; ethyl acetate; methanol; ethanol; halogen-substituted alkanes such as methylene chloride, chloroform, ethylidene chloride, vinylidene chloride, monofluorotrichloromethane, chlorodifluoromethane, dichlorodifluoromethane and the like; butane; hexane; heptane; diethyl ether; and the like. Gases inert to the starting components such as nitrogen, air, carbon dioxide and the like are also useful blowing agents. Compounds, such as azides, which decompose at suitable temperatures to produce gases such as nitrogen are also useful. Preferred blowing agents are compounds which boil between about −50° and 100° C., more preferably between about 0° and 50° C.

The amount of blowing agent or agents employed to prepare the foams of the present invention is preferably sufficient to foam the reaction mixture. The amount will vary with factors such as the density desired in a foamed product.

Water is a useful blowing agent for use in the practice of the invention and is a preferred blowing agent. In addition to generating carbon dioxide gas for foaming, water reacts quickly with polyisocyanate components, thus contributing to early polymer strength needed for gas retention. Generally, when water is used, it is preferably present in proportions of from about 1 to about 9 weight percent, more preferably from about 2 to about 7 weight percent, and most preferably from about 3 weight percent to about 5 weight percent of water based on total weight of active hydrogen components.

The present invention can be practiced by employing more than one blowing agent, however, generally employing only one blowing agent is preferred. When only one blowing agent is employed in a formulation of the present invention, it must be a carbon dioxide generating blowing agent. Of the carbon dioxide generating blowing agents, when only one blowing agent is employed, it is preferred that the blowing agent is water.

In addition to active hydrogen containing compounds and one or more blowing agents, the "B" component of the present invention can also contain other materials useful for preparing flexible polyurethane foams. These materials include, for example, catalysts, flame retardants, crosslinking agents, surfactants, cell openers, pigments, fillers and the like. Silicone surfactants and amine catalysts are preferred, but any catalyst or surfactant known to those skilled in the art to be effective in preparing polyurethanes can be used with the present invention. There are at least two general classes of cell openers generally used by those skilled in the art of preparing flexible polyurethane foams. Of those classes of cell openers, high molecular weight ethylene glycols and silicone surfactants are useful for preparing the foams of the present invention. Any type of catalyst useful in preparing flexible polyurethane foams can be used to prepare flexible foams of the present invention. More than a single catalyst is commonly used. Examples of catalysts useful to prepare the present invention are triethylene diamine gel catalysts, N,N-dimethylaminoethyl morpholine cure catalysts, and bis(dimethylaminoethylether) blow catalysts. Similarly, other additives useful in the preparation of flexible polyurethane foams known to those skilled in the art of preparing such foams can be used with the present invention.

The foams of the present invention can be prepared to have desirably high values for certain physical properties. For example, the foams of the present invention preferably exhibit tear strengths in the range of from about 1.2 pounds per linear inch (pli) to about 2.5 pli. Similarly, the tensile strength of the foams of the present invention will preferably be in the range of from about 15 pounds per square inch (psi) to about 36 psi, and elongation will preferably be from about 115 percent to about 185 percent.

The formulations used to prepare the foams of the present invention can have improved processing characteristics. For example, the formulations of the present invention can have improved flowability during processing as compared to conventional formulations. Flowability is the tendency of a formulation to fill a mold completely without leaving voids around the inserts, corners, and the like. A foam of the present invention can be prepared to have fewer and smaller voids than a conventional foam. Similarly, finished foams will preferably have fewer surface voids and flaws.

The foams of the present invention can preferably be cold cure molded foams. Cold cure molded foams are those which will cure without the addition of heat to the curing polymer. The cold cure molded foams of the present invention are particularly well suited for automotive manufacturing applications.

The foams of the present invention can also be prepared as slabstock foams. Slabstock foams are those which are prepared by pouring mixed A and B components onto a moving conveyor rather than injecting the components into a mold. The components are allowed to rise against gravity rather than filling the volume of a mold. The resulting polymer is then cut into rectangular "slabs" for further processing into desired shapes.

The formulations of the present invention can be used to prepare dual hardness foams. Dual hardness foams are those that have variable load bearing strength within the same foam. In preparing the dual hardness foams of the present invention, preferably, a single injection of mixed A and B components is made wherein the isocyanate index is changed during the injection to increase or decrease load bearing strength. Seat cushions wherein the center of the cushion is softer than the outer parts are typical examples of a dual hardness foam. Dual hardness foams prepared from the formulations of the present invention may also be prepared by dual injection.

The foams of the present invention can be tested to determine physical properties such as tensile strength and tear strength by any method known to those skilled in the art of testing flexible polyurethane foams. For example, the foams of the present invention can be tested by the methods disclosed in ASTM-3574-86, *Standard Methods of Testing Flexible Cellular Materials—Slab, Bonded, and Molded Urethane Foams*. Generally, the foams of the present invention can be tested by preparing specimens of foam by cutting them to a specified shape and then connecting them to a testing device which has a means of stretching the specimens and measuring the force applied to the specimens and distance the specimens are stretched prior to tearing or breaking.

The following examples and comparative examples serve to illustrate the present invention. These examples are included for illustrative purposes only and are not intended to limit the scope of the invention.

EXAMPLE 1

A flexible polyurethane foam is prepared by mixing:
(1) an "A" component consisting of a blend of: (a) a polyisocyanate having 60 percent methylene diphenyldiisocyanate monomer, the monomer having about 13 percent of the 2,4' isomer, and (b) a methylene diphenyldiisocyanate prepolymer prepared from formulations including a blend of dipropylene glycol and tripropylene glycol, the ratio of prepolymer to polyisocyanate being 60:40; and
(2) a "B" component. The "B" component consists of 100 parts 4,800 molecular weight polyoxypropylene polyether triol with 14 percent ethylene oxide capping, 5 parts 12,500 molecular weight mixed polyoxypropylene/polyoxyethylene polyol with 6.9 functionality, 3.5 parts water, 0.8 parts silicone surfactant, and 0.75 parts amine catalysts (0.3 triethylene diamine gel catalyst, 0.4 parts N,N-dimethylaminoethyl morpholine cure catalyst, and 0.05 bis(dimethylaminoethylether) blow catalyst).

The "B" component is mixed for about 25 seconds at 2,500 revolutions per minute (rpm) and then the "A" component is added and the two components mixed about 5 additional seconds at 3,600 rpm. The mixed "A" and "B" components are then poured into a rectangular mold 38.1 cm×38.1 cm×12.7 cm. After the reaction is complete, the foam is removed from the mold and aged for seven days at ambient conditions prior to testing.

Testing results are shown in the table following the examples.

COMPARATIVE EXAMPLE 2

The method of Example 1 is substantially followed except that:
(1) the "A" component consists of a polyisocyanate having 60 percent methylene diphenyldiisocyanate monomer, the monomer having about 13 percent of the 2,4' isomer; and
(2) the "B" component consists of 50 parts 4,800 molecular weight polyoxypropylene polyether triol with 14 percent ethylene oxide capping, 50 parts 2000 molecular weight polyoxypropylene polyether diol with 20 percent ethylene oxide capping, 5 parts 12,500 molecular weight mixed polyoxypropylene/polyoxyethylene polyol with 6.9 functionality, 3.5 parts water, 0.8 parts silicone surfactant, and 0.75 parts amine catalysts (0.3 triethylene diamine gel catalyst, 0.4 parts N,N-dimethylaminoethyl morpholine cure catalyst, and 0.05 bis(dimethylaminoethylether) blow catalyst).

Testing results are shown in the table following the examples.

EXAMPLE 3

The procedure of Comparative Example 1 is substantially followed except that:
(1) the "A" component consists of a blend of a polyisocyanate having 60 percent methylene diphenyldiisocyanate monomer, the monomer having about 13 percent of the 2,4' isomer and a methylene diphenyldiisocyanate prepolymer prepared from formulations having a blend of dipropylene glycol and tripropylene glycol, the ratio of prepolymer to polyisocyanate being 60:40; and
(2) the "B" component consists of 70 parts of 6,000 molecular weight polypropylene polyether triol having 15 percent ethylene oxide capping, 30 parts 5,000 molecular weight polypropylene polyether triol having 15 percent ethylene oxide capping and also containing an acrylonitrile-styrene copolymer, 0.5 parts diethanol amine crosslinking agent, 3 parts water, 0.9 parts silicone surfactant, 0.8 parts amine catalysts (0.6 triethylene diamine gel catalyst, 0.1 parts N,N-dimethylaminoethyl morpholine cure catalyst, and 0.1 bis(dimethylaminoethylether) blow catalyst), and 10 parts of a chlorofluorocarbon blowing agent.

Testing results are shown in the table following the examples.

EXAMPLE 4

The procedure of Example 3 is substantially followed except that: the "B" component consists of 80 parts of 6,000 molecular weight polyoxypropylene polyether triol having 15 percent ethylene oxide capping, 20 parts 5,000 molecular weight polyoxypropylene polyether triol having 15 percent ethylene oxide capping and also containing an acrylonitrile-styrene copolymer, 0.5 parts diethanol amine crosslinking agent, 3 parts water, 0.7 parts silicone surfactant, 0.7 parts amine catalysts (0.5 triethylene diamine gel catalyst, 0.1 parts N,N-dimethylaminoethyl morpholine cure catalyst, and 0.1 bis(-dimethylaminoethylether) blow catalyst), and 10 parts of a chlorofluorocarbon blowing agent.

Testing results are shown in the table following the examples.

EXAMPLE 5

The procedure of Example 1 is substantially followed except that:

(1) the "A" component consists of a blend of a polyisocyanate having 50 percent methylene diphenyldiisocyanate monomer, the monomer having about 8 percent of the 2,4' isomer and a methylene diphenyldiisocyanate prepolymer prepared from a formulation having a blend of dipropylene glycol and tripropylene glycol, the ratio of prepolymer to polyisocyanate being 50:50; and (2) the "B" component consists of 70 parts of 6,000 molecular weight polypropylene polyether triol having 15 percent ethylene oxide capping, 30 parts 5,000 molecular weight polypropylene polyether triol having 15 percent ethylene oxide capping and also containing a acrylonitrile-styrene copolymer, 0.5 parts diethanol amine crosslinking agent, 3 parts water, 0.9 parts silicone surfactant, 0.8 parts amine catalysts (0.6 triethylene diamine gel catalyst, 0.1 parts N,N-dimethylaminoethyl morpholine cure catalyst, and 0.1 bis(dimethylaminoethylether) blow catalyst), and 10 parts of a chlorofluorocarbon blowing agent.

Testing results are shown in the table following the examples.

COMPARATIVE EXAMPLE 6

The procedure of Example 1 is substantially followed except that:

(1) the "A" component consists of a polyisocyanate having 60 percent methylene diphenyldiisocyanate monomer, the monomer having about 13 percent of the 2,4' isomer; and (2) the "B" component consists of 50 parts 5,000 molecular weight polyoxypropylene polyether triol with 15 percent ethylene oxide capping, 50 parts 2,000 molecular weight polyoxypropylene polyether diol with 20 percent ethylene oxide capping, 5 parts 12,500 molecular weight mixed oxide cell opener with 6.9 functionality, 5 parts water, 0.8 parts silicone surfactant, and 1.1 parts amine catalysts (0.6 triethylene diamine gel catalyst, and 0.5 parts N,N-dimethylaminoethyl morpholine cure catalyst).

Testing results are shown in the following table.

| | Example and Comparative Example No. | | | | | |
|---|---|---|---|---|---|---|
| | 1 | 2* | 3 | 4 | 5 | 6* |
| Formulation/Test Results | | | | | | |
| "A" Component (Ratio) | | | | | | |
| Polyisocyanate 1[1] | 60 | 100 | 60 | 60 | | 100 |
| Polyisocyanate 2[2] | | | | | 50 | |
| Prepolymer[3] | 40 | | 40 | 40 | 50 | |
| "B" Component (Parts) | | | | | | |
| Polyol 1[4] | 100 | 50 | | | | |
| Polyol 2[5] | | | 70 | 80 | 70 | |
| Polyol 3[6] | | | 30 | 20 | 30 | 50 |
| Polyol 4[7] | | 50 | | | | 50 |
| Polyol 5[8] | 5 | 5 | | | | 5 |
| Surfactant[9] | 0.8 | 0.8 | 0.9 | 0.7 | 0.9 | 0.8 |
| Diethanol amine | | | 0.5 | 0.5 | 0.5 | |
| Water | 3.5 | 3.5 | 3.0 | 3.0 | 3.0 | 5 |
| Chlorofluorocarbons[10] | | | 10 | 10 | 10 | |
| Amine Catalyst 1[11] | 0.3 | 0.3 | 0.6 | 0.5 | 0.6 | 0.6 |
| Amine Catalyst 2[12] | 0.4 | 0.4 | 0.1 | 0.1 | 0.1 | 0.5 |
| Amine Catalyst 3[13] | 0.05 | 0.05 | 0.1 | 0.1 | 0.1 | |
| Test Results | | | | | | |
| Tensile Strength (psi) | | | | | | |
| Index 80 | 20 | 14 | | | | 17.7 |
| Index 85 | | | 28.3 | 19.3 | 28.6 | |
| Index 90 | | | | | | 20.4 |
| Elongation (percent) | | | | | | |
| Index 80 | 130 | 121 | | | | 114 |
| Index 85 | | | 198 | 174 | 134 | |
| Index 90 | | | | | | 110 |
| Tear Strength (pli) | | | | | | |
| Index 80 | 1.7 | 1.0 | | | | 0.97 |
| Index 85 | | | 2.25 | 2.01 | 1.69 | |
| Index 90 | | | | | | 1.00 |

*Comparative example; not an example of the present invention.
[1]Polyisocyanate 1 is a polyisocyanate having 60 percent methylene diphenyldiisocyanate monomer, the monomer having about 13 percent of the 2,4' isomer.
[2]Polyisocyanate 2 is polyisocyanate having 50 percent methylene diphenyldiisocyanate monomer, the monomer having about 8 percent of the 2,4' isomer.
[3]Prepolymer is a methylene diphenyldiisocyanate prepolymer prepared from a formulation consisting of a blend of dipropylene glycol and tripropylene glycol.
[4]Polyol 1 is a 4,800 molecular weight polyoxypropylene polyether triol with 14 percent ethylene oxide capping.
[5]Polyol 2 is a 6,000 molecular weight polypropylene polyether triol having 15 percent ethylene oxide capping.
[6]Polyol 3 is a 5,000 molecular weight polypropylene polyether triol having 15 percent ethylene oxide capping and also containing an acrylonitrile-styrene copolymer.
[7]Polyol 4 is a 2,000 molecular weight polyoxypropylene polyether diol with 20 percent ethylene oxide capping.
[8]Polyol 5 is a 12,500 molecular weight mixed polyoxypropylene/polyoxyethylene polyol with 6.9 functionality.
[9]Surfactant is a silicone surfactant, trade name B-4113 from Goldschmidt.
[10]Chlorofluorocarbons is a trichlorofluorocarbon, trade name FREON 11A from DuPont.
[11]Amine catalyst 1 is a triethylene diamine gel catalyst, trade name DABCO 33LV from Air Products.
[12]Amine catalyst 2 is a N,N-dimethylaminoethyl morpholine cure catalyst, trade name DABCO XDM from Air Products.
[13]Amine catalyst 3 is a bis(dimethylaminoethylether) blow catalyst, trade name NIAX A-1 from Union Carbide.

What is claimed is:

1. A method for preparing a flexible polyurethane foam comprising mixing as foam formulation components:

(1) an "A" component consisting of a blend of a polymethylene polydiphenyldiisocyanate and a methylene diphenyldiisocyanate prepolymer wherein the methylene diphenyldiisocyanate prepolymer is prepared from a prepolymer formulation having a first active hydrogen containing compound which has an average equivalent weight of about 30 grams per equivalent to about 600 grams per equivalent;

(2) a "B" component containing a second active hydrogen containing compound; and (3) a carbon dioxide generating blowing agent; under reaction conditions sufficient to prepare a flexible polyurethane foam.

2. The method of claim 1 wherein the first active hydrogen containing compound is dipropylene glycol, tripropylene glycol, or a mixture thereof.

3. The method of claim 2 wherein the blowing agent is water.

4. The method of claim 2 wherein the second active hydrogen containing compound is a blend of an ethylene oxide capped polypropylene polyether diol and an ethylene oxide capped polypropylene polyether triol having an average equivalent weight of about 1500 to about 2500 grams per equivalent.

5. The method of claim 2 wherein the second active hydrogen containing compound is amine terminated.

6. The method of claim 2 wherein the second active hydrogen containing compound is selected from the group consisting of an ethylene oxide capped polypropylene polyether diol, an ethylene oxide capped polypropylene polyether triol, a diol and an acrylonitrile-styrene copolymer, a triol and an acrylonitrile-styrene copolymer, a mixed diol/triol and an acrylonitrile-styrene copolymer, a polyisocyanate polyaddition polymer, and mixtures thereof.

7. The method of claim 2 wherein the foam formulation further comprises a surfactant and a catalyst.

* * * * *